Patented June 30, 1931

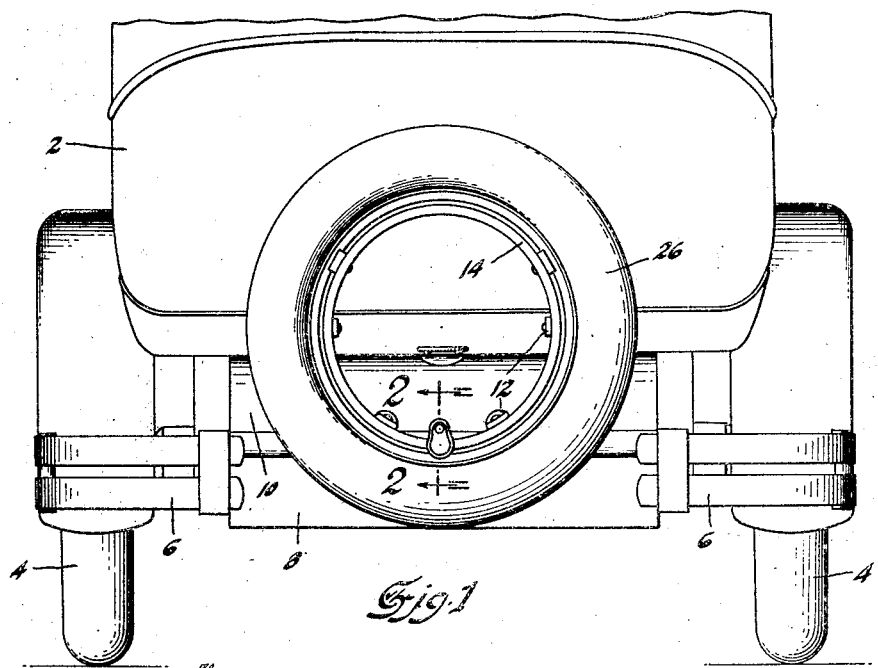
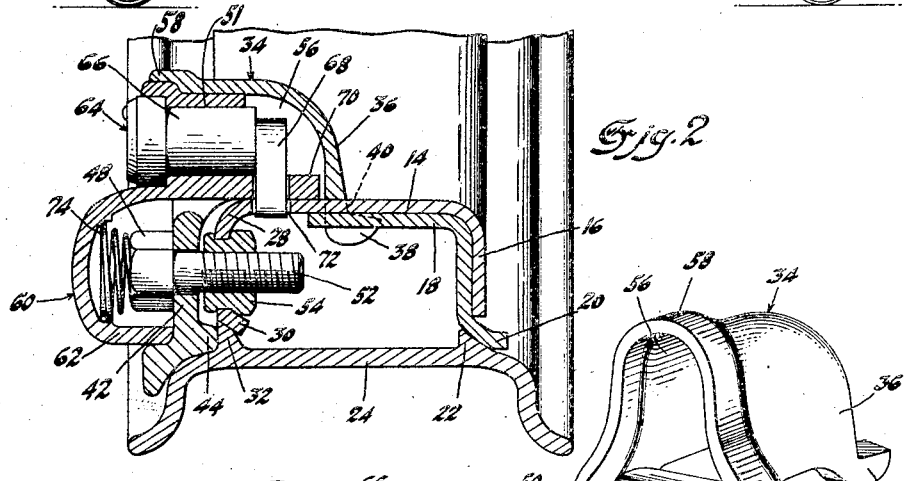
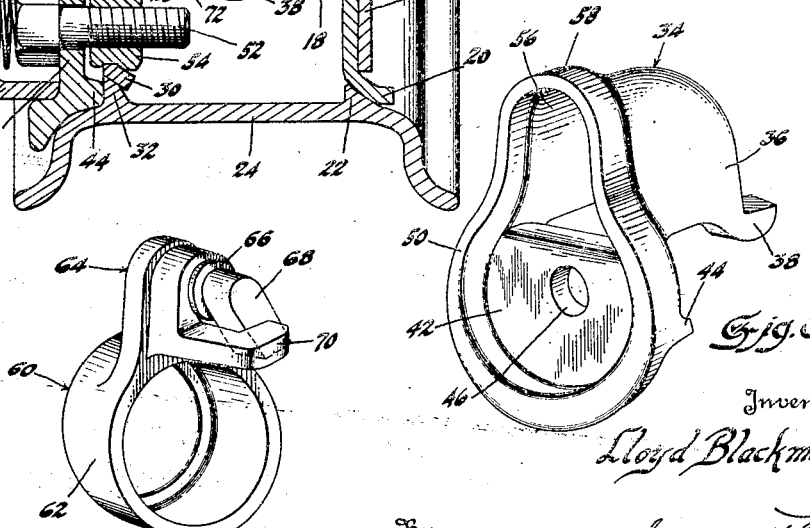

1,812,466

UNITED STATES PATENT OFFICE

LLOYD BLACKMORE, OF DETROIT, MICHIGAN, ASSIGNOR TO GENERAL MOTORS CORPORATION, OF DETROIT, MICHIGAN, A CORPORATION OF DELAWARE

TIRE CARRIER LOCK

Application filed October 19, 1928. Serial No. 313,505.

This invention relates to locks and has particular reference to a lock for holding a spare tire and its rim on a frame permanently secured to a vehicle.

The object of the invention is to construct the lock with but one clamping arm or lug which is secured to the felly or frame and which will completely conceal the bolt which ordinarily fastens or clamps the tire rim to the frame.

The object of the invention is accomplished by securing a flanged member to the inside of the frame which flanged member is adapted to engage one side of the tire rim. The opposite side of the frame is slightly bent and both the flanged member and the inwardly turned portion are adapted to seat on raised lugs or annular projections which are a permanent part of the tire rim. A locking member is adapted to fit over one side of the permanent rim and has a pair of terminal hooks adapted to fit in openings in the rim web. The other end of the locking member is provided with a lug or projection which engages the side of the tire rim. A nut is provided in the permanent rim and a bolt passed through an opening in the lug and screwed into the nut in the rim. The locking member is hollow and in this hollow portion there is adapted to fit a cover member containing a lock. The covering member contains a lock barrel and completely houses and conceals the head of the bolt. By turning the lock barrel the locking latch is thrown into position and engages through the web of the tire rim to rigidly hold the parts together.

On the drawings:

Fig. 1 shows a view of the rim portion of an automotive vehicle with the invention applied thereto.

Fig. 2 is a section on the line 2—2 of Fig. 1 with the tire omitted.

Fig. 3 is a perspective view of the locking member.

Fig. 4 is a perspective view of the covering member.

Referring to the drawings, the numeral 2 indicates an automotive vehicle as a whole having the wheels 4, the rear quarter bumpers 6, the gas tank 8, and a rear covering 10 over the gas tank. Mounted on the covering member 10 as at 12, is a suitable frame indicated at 14. The frame is shown as a ring but may be of any other suitable type as a spider, etc. The parts so far described are conventional and per se form no part of the invention.

Referring to Fig. 2, it will be seen that on the inside of the frame 14 at the side 16 there has been provided the plurality of brackets or angle pieces 18 which are permanently secured to the rim either by welding or riveting. The angle pieces have flanged terminals 20 adapted to engage with projecting portions on an annular rib 22 formed on the rim 24 which is adapted to carry the tire 26. The opposite flange 28 of the frame 14 is inwardly bent as at 30 and is adapted to engage with projecting lugs or an annular flange 32 formed as an integral part of the rim 24. From an examination of Figure 2 it will be apparent that when the locking parts are free the rim 24 can be removed from the frame 14 by a movement to the left.

The locking member is shown in perspective view in Fig. 3 and is indicated as a whole by the numeral 34. The end 36 is provided with one or a pair of lugs 38 adapted to engage in openings 40 in the web of the rim 14 and have the hook portions engage underneath the rim. Suitable provision is made in the angle member 18 to allow for the engagement of the lugs 38, the locking member preferably though not necessarily being applied at a bracket. The opposite end 50 of the member 34 is formed into a lug or extension 42 having an inturned projection or abutment 44 adapted to engage the face of a projection or the annular flange 32 as shown in Fig. 2. The lug is provided with an opening 46 adapted to receive the shank portion or the bolt 52, provided with a head 48, and a threaded end 52. The threaded end 52 is adapted to be screw threaded into a nut 54 rigidly mounted in the flange 28 of the rim 14, as shown in Fig. 2.

The upper portion of the locking member 34 is hollow as indicated at 56 and around the outer edge of the member 34 a flange 58 is provided. Fitting in the hollow portion and engaged by the flange 58 is the covering member 60. The covering member comprises the hollow lower housing portion 62, conforming closely to the flanged part 58 and adapted to fit over the face of the lug 42 and conceal the head 48 of a bolt 52, and the upper portion which closely conforms to the flange 58 and is provided with a lock mechanism 64 adapted to extend in the hollow portion 56. The lock mechanism includes the locking barrel 66 and the locking dog or bolt 68. The locking dog or bolt 68 is adapted to engage behind a hook 70 formed integral with the covering member 60 and into an opening 72 in the web of the rim 14. When the lug is in the position shown in Fig. 2 the parts are in locked position and cannot be removed.

To unlock the structure a key is inserted in the barrel 66 and the lug 68 turned through 90 degrees which will permit of the withdrawal of the covering member 60. The width of the upper hollow portion 56 is sufficient to allow the dog 68 to swing through an arc in excess of 90 degrees.

A spring 74 preferably having one end rigidly secured at the interior of the hollow or housing portion 62 may be provided to strike against the head 48 to assist in holding the parts in rigid relation and prevent rattle. If desired, the spring may be omitted.

If desired the brackets 18 may be omitted and instead a corresponding and substantially similarly cross-sectional shaped integral flange or lip provided on the frame 14.

I claim:

1. In a tire lock, a frame permanently secured to a vehicle, a tire rim removably mounted over the frame, a lock member having one end secured to the frame and its other end overlapping the frame side and having its extremity engaging the tire rim, a bolt passing through said overlapping end and having a threaded connection with said frame, a second lock member fitting the first named lock member and concealing said bolt, and means engaging in said frame and locking said lock members together.

2. In a tire lock, a frame permanently secured to a vehicle and adapted to removably receive a tire rim, a hollow lock member secured at one end to the frame and engaging with the tire rim at its other end, a bolt having its head seated in the hollow and its shank having a threaded connection with the frame to rigidly hold the rim and frame together, a second lock member fitting in and closing the hollow portion of the first member and concealing the bolt head, a lock, and a bolt on said lock engaging said frame and one of said locking members to hold the parts in locked position.

3. In a tire lock, a frame permanently secured to a vehicle and adapted to removably receive a tire rim, a lock member removably secured at one end into the mid portion of said frame and at its other end engaging the tire rim, a bolt passing through said member and having a threaded engagement with said frame to rigidly hold said frame and said rim together, a second lock member interfitting said first lock member and covering the exposed end of said bolt, and means for locking the members together.

4. In a tire lock, a frame U-shaped in cross section and permanently secured to a vehicle and adapted to removably receive a tire rim, a lock member mounted at one side of the frame and engaging the rim, a removable connection between one end of said member and the base of the U-shaped portion of said frame, a bolt passing through the other end of said member and secured to said frame, a second lock member interfitting in said first named lock member and concealing said bolt, and means for locking said members together.

5. In a tire lock, a frame U-shaped in cross section secured to a vehicle and adapted to removably receive a tire rim, a lock member fitting over the base and one side of the U, means to removably secure one end of said member to the base of the U, the other end of said member engaging said tire rim, means passing through said other end and secured in said frame to rigidly hold said rim on said frame, a second lock member interfitting with said first named lock member and concealing said means, and means for locking said members together.

In testimony whereof I affix my signature.

LLOYD BLACKMORE.